Figure 1:
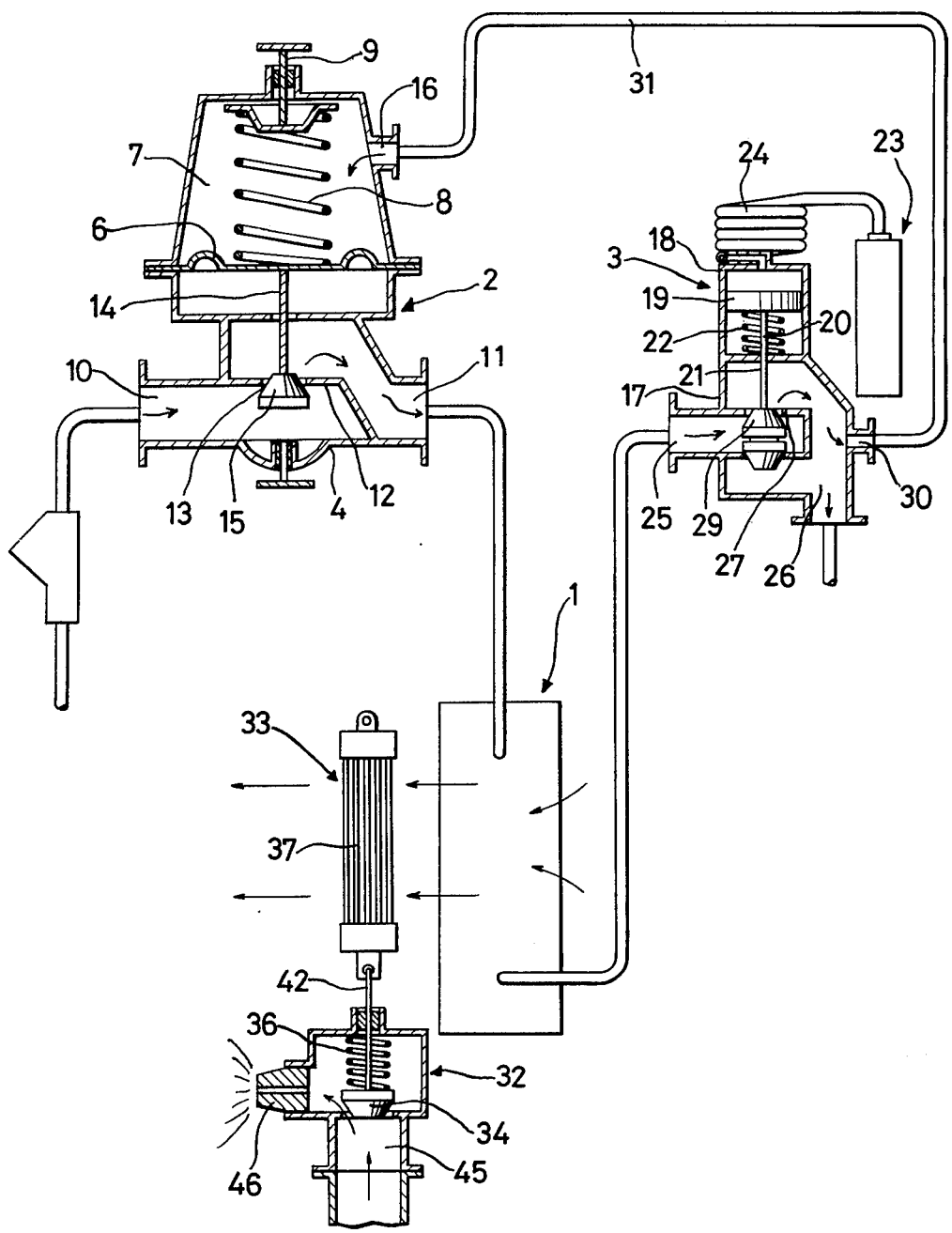

United States Patent [19]

Motoyama

[11] 3,877,637
[45] Apr. 15, 1975

[54] AUTOMATIC TEMPERATURE AND HUMIDITY REGULATING APPARATUS

[76] Inventor: Hisashi Motoyama, No. 3-5, Ebara 7-chome, Sinagawa-ku, Tokyo, Japan

[22] Filed: Mar. 15, 1973

[21] Appl. No.: 341,573

[30] Foreign Application Priority Data
Apr. 1, 1972 Japan................................ 47-32742
Apr. 1, 1972 Japan................................ 47-32743

[52] U.S. Cl.................... 236/44 C; 165/39; 236/36; 236/92 R
[51] Int. Cl........................ G05d 23/02; G05d 22/00
[58] Field of Search ........ 165/21, 39; 236/92 R, 85, 236/1 B, 44 C, 18, 36

[56] References Cited
UNITED STATES PATENTS
2,003,585 6/1935 Dunham............................ 236/92 R
2,204,016 6/1940 Karlson............................. 165/20 X Primary Examiner—William E. Wayner
Attorney, Agent, or Firm—Frank J. Jordan

[57] ABSTRACT

The present invention relates to an automatic temperature and humidity regulating apparatus for indoor air comprising (1) a heat exchanger (2) a constant flow valve device being so associated and constituted that a differential pressure regulating valve having a diaphragm is connected to an inlet side of the heat exchanger and that a temperature compensating valve having a characteristic to pass a desired flow at its fixed rate by self-regulation of the degree of valve opening in sensing temperature variation through a temperature sensing sleeve is connected to an outlet side of the heat exchanger whereby pressure of the downstream side of the outlet of the temperature compensating valve is fed back to the differential pressure regulating valve as a signal pressure and (3) a humidity regulating valve providing a humidity detecting body disposed in a ventilating passage of the heat exchanger.

6 Claims, 4 Drawing Figures

AUTOMATIC TEMPERATURE AND HUMIDITY REGULATING APPARATUS

The technical field pertaning to the present invention includes "Automatic Temperature and Humidity Regulation" classified in class 236 of the patent classification and "Valve and Valve Actuation" classified in class 251 thereof. Namely, the present invention relates to an automatic temperature and relative humidity regulating apparatus comprising a principal constant flow valve device adapted to assure a balanced quantitative flow over a number of heat exchangers on the basis of a predetermined temperature and an automatic humidity supply device combined therewith.

In heating and cooling equipments in which fluid such as hot water or cold water circulates as the heating medium, there are a number of radiators, heat exchangers or hot water suppliers disposed according to its object and scale. As a system which supplies an equally balance quantitative flow to all of the devices under temperature conditions predetermined therefor, there is a reverse return system to equalize pipe extensions of go and return paths for each radiator or the like.

However, piping resistance as regards each room is complex and divergent in giantic and high-rised buildings of recent years, if the piping extentions of each radiator are equal it is next to impossible to obtain the same resistance therebetween and in such a case the execution of a direct return system has been impossible. In the reverse return system, furthermore, because its entire piping extension becomes extremely long it has had some economic disadvantages.

Also, besides a system, there was a valve regulating mechanism to regulate flow according to the predetermined temperatature by providing sluice valves to the inlet and outlet ports of respective radiators or to dispose an autuomitic temperature regulating valve.

In the valve regulating mechanism, respective valves must be regulated according to each floor of the building or the construction of its piping and moreover, since it is impossible to sensitively follow to the variation of fluid supplying pressure after the regulation it was difficult to effect the entirely valanced control of flow for satisfying its desired temperature condition.

Further, the principal object of the heat exchanger in the prior art is to cause room temperature to rise and drop and regulation of relative humidity has based on a regulating device separately provided or has not executed it. Also the separately provided devices were complex in construction and expensive.

To solve such deficiencies and disadvantages of previous heat exchangers, an object of the present invention is to provide an apparatus for carrying out the proper room temperature regulation and the automatic humidity regulation on the basis of the predetermined flow always assured by a cascade control so associated and constituted that a valve adapted to actuate according to flow condition supplied is provided at the inlet side of a radiator, heat exchanger or the like and a valve having a characteristic to flow the desired heating medium according to temperature is provided at the outlet thereof whereby the pressure of the heating medium occurring to its downstream side is fed back to an upper chamber of an inlet valve as a signal pressure.

Another object of the present invention is to provide an individual device for employing the above series devices, that is, a constasnt flow valve device and an automatic humidity regulating device.

A further object of the present invention is to provide a new constant flow valve device which is capable of adopting a direct return system as its return system.

Figure 2:
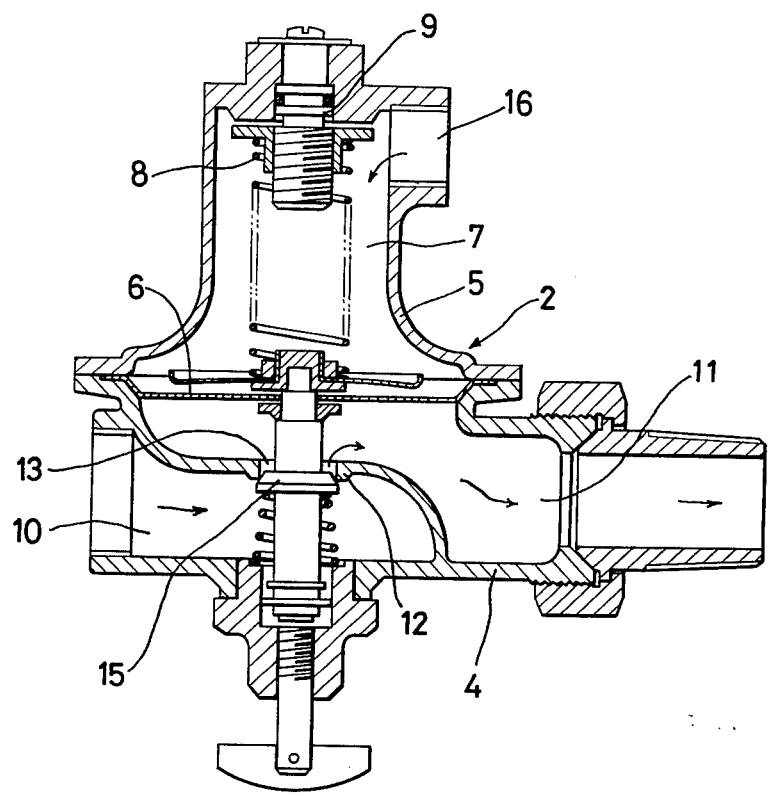
Figure 3:
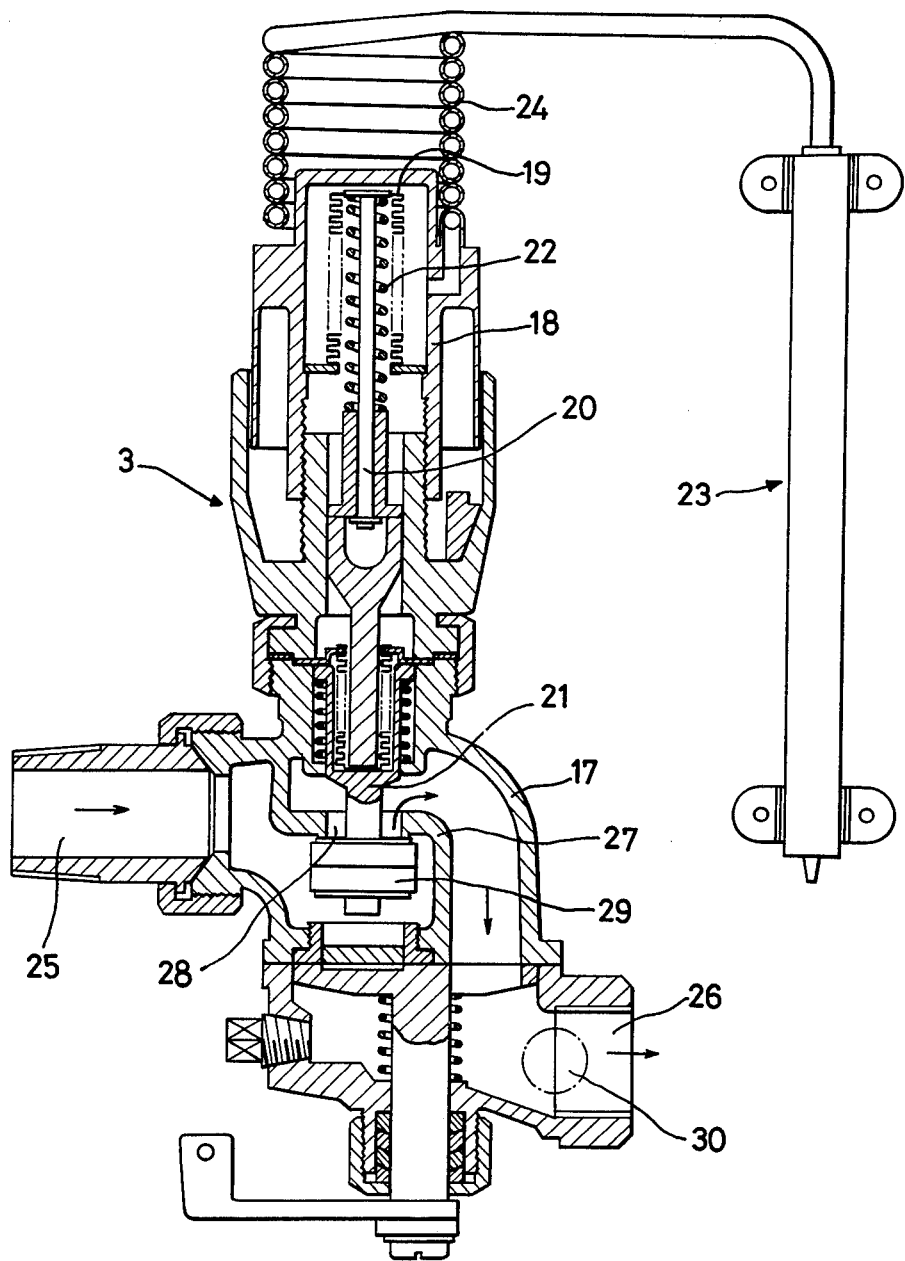
Figure 4:
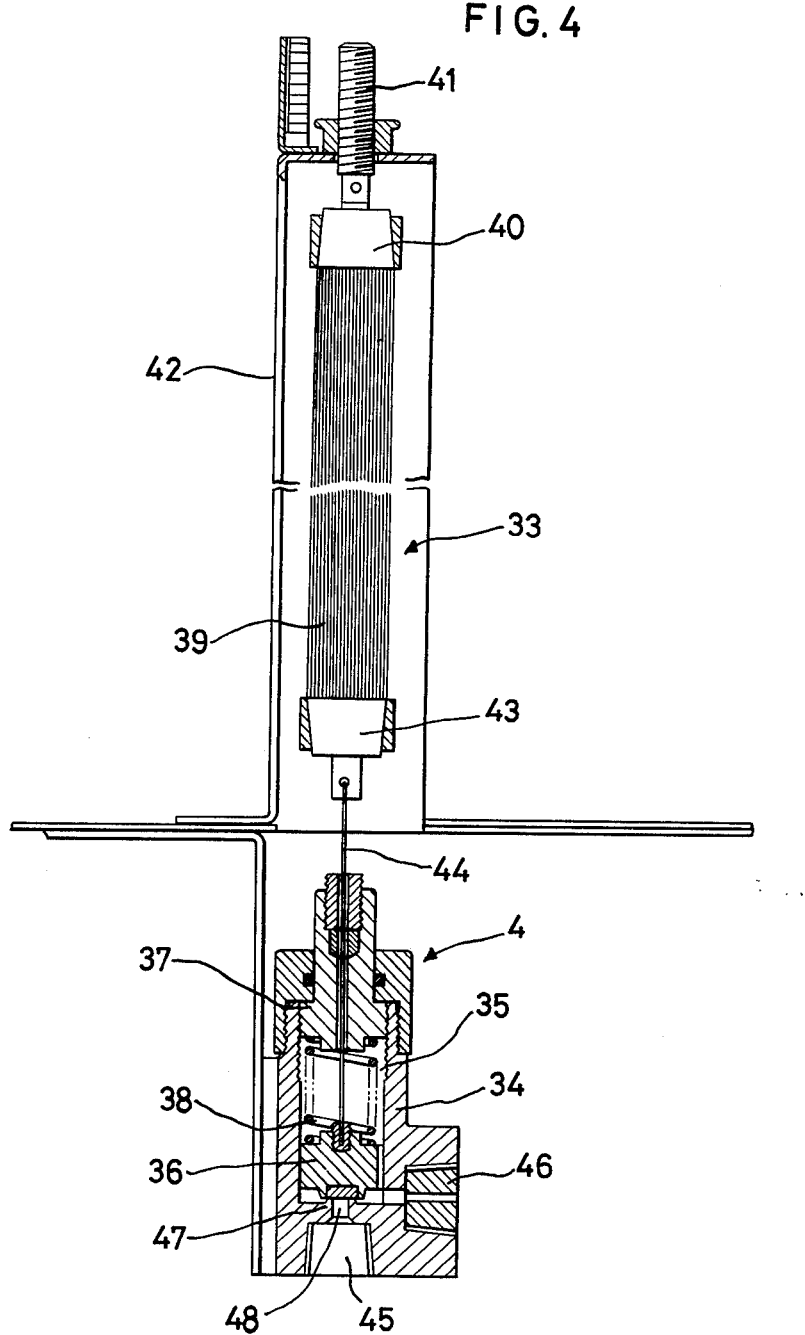

The accompanying drawings illustrate one embodiment of an automatic temperature and humidity regulating apparatus according to the present invention:

FIG. 1 is a partial longitudinal sectional view roughly showing an entire device in accordance with the present invention, FIG. 2 is a vertical sectional view of a differential pressure regulating valve, FIG. 3 is a longitudinal section view of a temperature compensating valve, and FIG. 4 is a vertical sectional view showing a humidity regulating device.

An embodiment of an automatic temperature and humidity regulating apparatus according to the present invention will be explained, referring to the accompanying drawings.

As shown in FIG. 1, an apparatus is provided with a differential pressure regulating valve 2 at an inlet side of a heat exchanger 1 and a temperature compensating valve 3 at an outlet thereof, respectively and is communicated and constituted to feed back an outlet side pressure of the temperature compensating valve 3 to the differential pressure regulating valve 2. Secondly, in the differential pressure regulating valve 2 as shown in FIGS. 1 and 2 a valve body 4 and a lid body 5 are isolated by means of a diaphragm 6 and a spring 8 is interposed to press the diaphragm 6 in an upper chamber 7 in the lid body 5. An adjusting screw bar 9 is provided on an upper end of the spring 8 and a valve inlet 10 and a valve outlet 11 are provided on both sides of a valve housing 4, respectively. The valve inlet 10 and the valve outlet 11 communicate with each other through a valve port 13 provided in a valve seat 12. Disposed at the valve port 13 is a valve body 15 which is constituted to freely engage and disengage from the valve port 13 and which is provided on a lower end of an upwardly and downwardly slidable valve stem 14 connected to the diaphragm 6 at an upper end thereof. The lid body 5 has at its one side a communicating port 16 for communicating with the above mentioned temperature compensating valve 3.

The temperature compensating valve 3, as shown in FIGS. 1 and 3, comprises a cylinder or bellows 18 to reciprocate upwardly and downwardly at an upper portion of a valve housing 17. A valve stem 21 is associated at a lower end of a rod 20 of a free reciporcating piston 19 in the cylinder or bellows 18 and meanwhile the piston or bellows 19 is always upwardly pressed through the intermediary of a spring 22 interposed on the rod 20. Also, a temperature sensing sleeve 23 filled with fluid for sensing the temperature in the cylinder or bellows 18 communicate through the intermediary of a communicating pipe 24 in coil form, for example, if the temperature rises the actuating fluid in the temperature sensing sleeve 23 expands to increase the fluid pressure in the cylinder or bellows 18 and as a result, the piston or bellows 19 is depressed against the action of the spring 22. Further, a valve inlet 25 and a valve outlet 26 communicate through the intermediary of a valve post 28 provided in a valve seat 27 and an inner valve body 29 provided at a lower end of the valve stem 21 associating with the rod 20 is constituted to freely engage and disengage from the valve port 28.

Furthermore, the present temperature compensating valve 3 is constituted to have reverse and positive plugs of its path to be capable of using for both the cold water and the hot water as the heating medium of the heat exchanger 1 and a three way control valve is double incorporated at the valve inlet.

Provided at the downstream side of the valve outlet 26 of the valve housing 27 is an extracting port 30 for feeding back to the aforesaid differential pressure regulating valve 2 by extracting the pressure of the outlet side, the extracting port communicating with the commnicating port 16 of the differential pressure regulating valve 2 through the intermediary of a conduit 31.

Moreover, a manually or automatically operated mechanism is included in the temperature compensating valve (3), and said mechanism is used for predetermination of the flow characteristic of the valve having a linear value.

Secondly, a humidity regulating valve 32, as shown in FIGS. 1 and 4, has a humidity detecting body 33 disposed in a ventilating path of the heat exchanger 1 and an inner valve body 36 provided at a lower end of a cylinder portion or bellows 35 of a valve sleeve 34. A spring 38 is interposed between an upper surface of the valve body 36 and a lower surface of a cover body 37 threaded in the valve sleeve 34, so as to always downwardly press the inner valve body 36 and meanwhile in the humidity detecting body 33. An adjusting screw bar 41 is connected to an upper support 40 of a detecting element 39, such as synthtic fiber, and is threaded in an upper flange of a support 42 for the detecting body 33. Also a lower support 43 of the detecting element 39 connected to the inner valve body 36 through the intermediary of a wire 44.

Furthermore, the valve body 34 is provided with a water supply port 45 at its lower end and a nozzle portion 46 for humidity supply at a side surface. These communicate through the intermediary of a valve port 48 pierced in a valve seat 47 and the valve body 36 is constituted to freely engage and disengage from the valve seat 47.

The present invention is based on the construction as mentioned above and its operation will be explained below. In the heat exchanger 1, it is preferable to always flow the constant flow of the heating medium (cold or hot water) and the heat exchanger 1 is required to actuate in such a way that the flow of the heating medium increases and decreases according to the variation of the room temperature to compensate it at the predetermined temperature. Thus, the differential pressure regulating valve 2 disposed at the inlet side of the heat exchanger 1 is so constituted that its degree of opening of the valve port 13 of the inner valve body 15 is determined according to the flow predetermined of the heat exchanger 1. If the pressure of the valve outlet side of the differential pressure regulating valve, that is, the pressure in the heat exchanger 1 raises, the diaphragm 6 ascends against the action of the spring 8 and as a result of this the degree of opening degree becomes small by rising of the valve body 15. This means that the heat loss (radiating rate) of the radiator is small. Accordingly, it means that if the flow of the heating medium at the downstream side of the outlet valve increases, its pressure increases and since the strong pressure to be fed back improves the aforesaid condition of the degree of opening of the inlet valve of the heat exchanger, the flow is maintained constant. Meanwhile, in the temperature compensating valve 3, if the room temperature varies, the acting fluid in the temperature sensing sleeve 23 changes in volume whereby the fluid pressure in the cylinder or bellows 18 increases and decreases to move upwardly and downwardly the inner valve body 29, as mentioned hereinabove and as a result the opening degree of the valve changes.

Then, since the extracting port 30 is provided at the side of the valve outlet 26 of the temperature compensating valve 3 and the aforesaid differential pressure regulating valve 2 communicates with the communicating port 16 through the intermediary of the conduit 31, the pressure of the downstream side of the outlet of the temperature compensating valve 3 is fed back to the differential pressure regulating valve. Therefore, if the outlet pressure rises this pressure rising is immediately associated with the upper chamber 7 of the differential pressure regulating valve 2 and permits the pressure in the upper chamber 7 similarly to rise. Thereupon, the diaphragm 6 is depressed by the pressure rising and in turn the valve stem 14 and the valve body 15 move down to cause its degree of opening to increase. As a result, because the flow passing the differential pressure regulating valve 2 increases, the pressure of the outlet side rises, that is, the pressures of the heat exchanger 1 and of the valve inlet 25 of the temperature compensating valve 3 rise. Then, a balanced condition is attained at this flow.

Now, if the room temperature rises according to the rising of the outside temperature and it becomes necessary to lower the temperature to the predetermined temperature, for this purpose it is necessary to cause the flow of the fluid medium (cold water) in the heat exchanger 1 to increase.

In such a case the temperature sensing sleeve 23 of the temperature compensating valve 3 first senses this variation and as the result of this the opening degree of the valve increases as mentioned above. Accordingly, the raised pressure of the outlet side of the temperature compensating valve 3 is fed back to the differential pressure regulating valve 2 as a signal pressure and as mentioned above, the degree of opening of the differential pressure regulating valve 2 increases to thereby increase the flow.

Thus, this device sensitively detects the variation of the temperature so as to control the flow in proportional relation.

Further, as an important function of the present invention, there is an action that even if the pressure of the inlet side of the differential pressure valve 2 is rapidly varied, it sensitively responds to this to assure the stable predetermined flow to the heat exchanger 1.

Originally, if a differential pressure regulating valve having a diaphragm (bellows) is disposed thereto, though the fixed flow can be assured in principle for the pressure variation of the inlet side it was practically difficult to assure the predetermined flow because the diaphragm did not follow accurately and rapidly the pressure variation under various conditions.

On the contrary, in the present invention, upon the rapid variation of the inlet side pressure (supply pressure) of the differential pressure regulating valve 2, if the pressures of the heat exchanger 1 and the temperature compensating valve 3 vary in a condition that the differential pressure regulating valve 2 can not follow this variation, since this is immediately fed back to the differential pressure regulating valve 2 through the intermediary of the extracting port 30 according to the pressure variation of the outlet side of the temperature compensating valve 3. Thus the diaphragm (bellows) 6 is actuated according to the pressure variation of the upper chamber 7 to thereby actuate the valve body 15, and its degree of opening is regulated so that the flow control is effected. Such function for maintaining an arbitrary predetermined flow according to the present invention increases its accuracy as compared with the case where the differential pressure regulating valve has only a diaphragm disposed therein.

As explained hereinabove, when the pressure difference between the inlet and outlet sides of the temperature compensating valve 3 varies it affects the flow and when the inlet side pressure is fixed the outlet side pressure varies according to the degree of opening of the valve. Since, if the degree of opening of the valve is prescribed, the flow becomes constant and if the degree of opening of valve is set the stable flow can be assured in relation to the pressure difference as aforesaid. If the degree of opening of the temperature compensating valve 3 is set to obtain the predetermined flow previously measured to have a known value of its desired flow of the heat exchanger 1 under the fixed room temperature (for example, 20° C) and this outlet side pressure is fed back to the differential pressure regulating valve 2 as its signal pressure, the differential pressure regulating valve 2 regulates itself the degree of opening according to that of the temperature compensating valve 3. Thus the valve increases and decreases the supply flow to the heat exchanger 1 so as to provide the flow control in accordance with the change of the room temperature thereby to attain sensitivity and maintain the predetermined room temperature of the heat exchanger 1.

Successively explained is the operation of the automatic humidity supply device.

As shown in FIGS. 1 and 4, if the detecting element 39 of the humidity detecting body 31 shrinks by detecting the change of the humidity the valve body 36 through the wire 44 rises against the action of the spring 38. Then the humidity supply water from the water supply port 45 is sprayed from the nozzle portion 46 via the valve port 48 to the ventilating outlet of the heat exchanger 1 so as to carry out the humidity supply action. At this time drops of moisture may be sprayed as to provide wetting of a wick element in a manner so that it does not moisten its circumference and thereafter it is preferable to allow vaporization by drying or by electric heat in introducing it into a VAPOR PAN.

As mentioned above, in the constant flow valve device pertaining to the present invention, the flow characteristic of the temperature compensating valve 3 at the outlet side of the heat exchanger 1 is linear. If the room temperature rises with the rising of the outdoor temperature the degree of opening of the valve increases and at this time, by the feed back to the differential pressure regulating valve 2 of the variation of the outlet side pressure, the flow in the heat exchanger 1 is consequently controlled in proportional relation according to the room temperature.

Also, in the present invention even when variations in pressure of the water supply to the heat exchanger 1 tends to vary the flow rate to the heat exchanger 1, the latter remains the in a stable condition so long as there is no change of temperature. For example, by varying of the water supply pressure, the outlet side pressure of the differential pressure regulating valve 2, that is, the pressure of the heat exchanger varies, and the inlet side pressure of the temperature compensating valve 3 and the outlet side pressure thereof vary, respectively. Accordingly, the feed back of the outlet side pressure of the temperature compensating valve 3 is immediately transmitted to the differential pressure regulating valve 2 to thereby actuate the diaphragm 6. Therefore, the degree of opening of the valve with its upward and downward movement of the inner valve body 15, will be regulated and the flow passing the differential pressure regulating valve 2 is controlled so that the flow in the heat exchanger 1 becomes stable in the fixed condition. In such a manner, the flow in the heat exchanger 1 is controlled in proportional relation to the change of the room temperature and the maintenance of the intended predetermined room temperature is obtained. Meanwhile if the humidity in the room changes, that is, if it dries below the prescribed humidity, the humidity supply action of the humidity regulating valve 32 is displayed. Namely, if it goes below the predetermined humidity, the humidity supply from the nozzle portion 46 is carried out by rising of the valve body 36 following the shrinkage of the humidity detecting body 33.

Further, in this embodiment the explanation is mainly set forth regarding cooling but it can similarly perform the same action in heating.

In short, the present invention is associated and constituted to feed back the outlet side pressure of the temperature compensating valve 3 as a signal pressure to the differential pressure regulating valve 2 by providing the differential pressure regulating valve 2 at the inlet side of the heat exchanger and the temperture compensating valve 3 at the outlet side of the heat exchanger. Meanwhile, since the temperature and the humidity is adapted to be regulated by providing the humidity regulating valve 32 which has the humidity detecting body 33 in the path of the heat exchanger, the flow in the heat exchanger 1 may be positively controlled in proportional relation. Since the maintenance of the predetermined flow is possible by self-regulation when the supply pressure to the heat exchanger 1 varies, it does not cause an inconvenience that the flow in the heat exchanger 1 changes by the variation of the supply pressure without reference to its constant room temperature. Therefore, it carries out a cascade control of a number of heat exchangers according to respective room temperature and further compensates the previous constant flow valve so as to increase its accuracy so that it saves time to regulate each time and it is possible to provide uniform management. Furthermore, if the relative humidity in the room deteriorates below the predetermined value, it is immediately possible to supply humidity and ideal air conditioning can be attained in cooperation with both.

What is claimed is:

1. An automatic temperature and humidity regulating apparatus comprising a heat exchanger, a differential presssure regulating valve at an inlet side of said heat exchanger, said differential pressure regulating valve having an upper part and a lower part, a flexible means in said upper part dividing the latter into an upper section and a lower section, a spring in said upper section biasing said flexible means in a direction to open the differential pressure regulating valve, a valve stem connected to said flexible means, said valve stem extending from said lower section into said lower part, a valve element on said valve stem disposed in said lower part, a temperature compensating valve at an outlet side of said heat exchanger, said temperature compensating valve having a temperature sensing sleeve having fluid therein, piston means on said temperature compensating valve operable to move up and down and control said temperature compensating valve according to the expansion of said fluid in said sensing sleeve, said temperature compensating valve having an outlet, and conduit means between said outlet of said temperature compensating valve and said upper section of said upper part of said differential pressure regulating valve, whereby said conduit transmits the outlet pressure of said temperature compensating valve to said differential pressure regulating valve to effect control of the latter, and a humidity control valve having a humidity detecting device in the ventilating path of said heat exchanger.

2. An automatic temperature and humidity regulating apparatus comprising a heat exchanger having an inlet and an outlet, a differential pressure regulating valve at the inlet of said heat excchanger, said differential pressure regulating valve having means defining a pressure regulating chamber, a temperature compensating valve at the outlet of said heat exchanger, said temperature compensating valve having an outlet port, conduit means between said outlet port of said temperature compensating valve and said pressure regulating chamber for transmitting the outlet pressure of said temperature compensating valve to the pressure regulating chamber of said differential pressure regulating valve to effect control of the latter, and a humidity control means having a humidity detecting device located in a ventilating path fo said heat exchanger.

3. An apparatus according to claim 2 wherein said humidity control means comprises a humidity control valve disposed in the ventilating path of said heat exchanger, and a control mechanism for opening and closing said humidity control valve in response to said humidity detecting device.

4. An apparatus according to claim 2 wherein said differential pressure regulating valve includes a valve control section disposed on a valve body, said valve control section being divided into a first chamber and a second chamber by a flexible means, said first chamber constituting said pressure regulating chamber, said second chamber being exposed to the pressure of the fluid at the inlet of said heat exchanger, and a spring in said first chamber biasing said flexible means towards said second chamber.

5. An apparatus according to claim 4 including a valve element connected to said flexible means, and a valve seat in said valve body cooperable with said valve element to control fluid flow through said differential pressure regulating valve, whereby said flexible means is urged in one direction by said spring and by the pressure in said conduit means tending to open said differential pressure regulating valve and in an opposite direction by the pressure in said second chamber tending to close said differential pressure regulating valve.

6. An apparatus according to claim 2 wherein said temperature compensating valve comprises means sensitive to temperature to open and close the temperature compensating valve in response to temperature variations.

* * * * *